May 30, 1933.  G. TANZI  1,912,021
MACARONI AND MEANS FOR PRODUCING SAME
Filed March 31, 1932
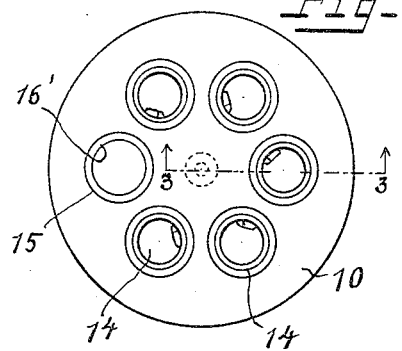
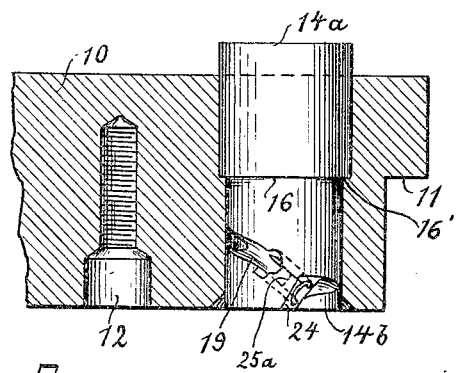
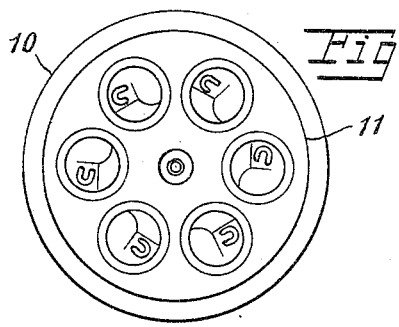
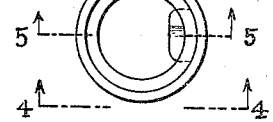
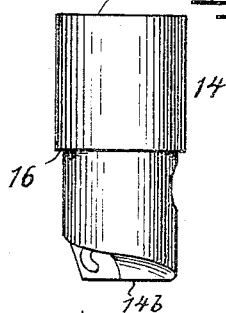
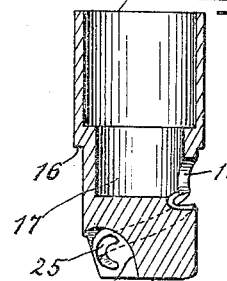
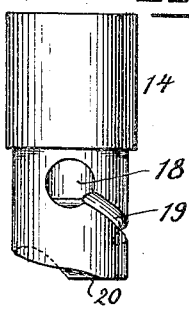
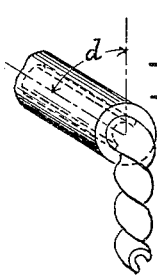
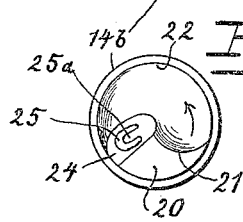
INVENTOR.
Guido Tanzi
BY Waldo M. Chapin
ATTORNEY Patented May 30, 1933

1,912,021

UNITED STATES PATENT OFFICE

GUIDO TANZI, OF BROOKLYN, NEW YORK, ASSIGNOR TO V. LA ROSA & SONS, INC., OF BROOKLYN, NEW YORK, A CORPORATION OF NEW YORK

MACARONI AND MEANS FOR PRODUCING SAME

Application filed March 31, 1932. Serial No. 602,270.

This invention is concerned with improvements in the form and the means of production of macaroni.

A species of macaroni of the type known as "fusillo" consists of a tubular product commonly wound into spiral formation, resembling in shape a more or less distended spiral spring. This tubular product has hitherto been made by means of mechanism whereby an endless macaroni is extruded from a hollow die provided with a central pin around which the dough closes up and leaves the die in the shape of a hollow tube. The curvature of the spirals of this tubular form have been commonly produced by elongating one side of the tube wall, either by causing an excess of the dough to flow on this side—which becomes convex—or by retarding the flow on the other side—which develops into the concave side. This excess flow of the dough in the case of fusillo macaroni is usually initiated by extruding it from a source located to one side of the base of the central pin which creates the hollow core of the macaroni.

The principles heretofore explained have been employed in other technical arts which are concerned with the molding of plastic material into tubular form; for instance, in the manufacture of lead tubing, rosin-core solder, lead covered cables, and the like. In the manufacture of hollow lead tubing also the eccentric distribution of the material fed into the tubular die and the resulting speeding up of the material in one segment of the annular wall is utilized to produce curvatures or twists in the extruded material; for instance, in the manufacture of S-shaped sink traps, elbows, etc.

The longitudinal perforation of the macaroni serves the purpose of transforming it into a loose-lying dough mass with many interstices so that it will cook speedily and the juice and sauces will have free access to all portions of the dough.

It is the first object of this invention to provide a new form of the manufactured article which preserves and even increases all the advantages resulting from the tubular and spiral form of the article, as above described.

Another object is to provide a hollow form of macaroni which although approximating in appearance and structure the hitherto known spiral form, yet in the process of cooking gives free access for the juices to all parts of the hollow interior of the tube simultaneously.

Another object is to manufacture macaroni in such form that although the entire bulk when closely packed together represents a very porous mass with interstices communicating everywhere throughout it, yet the single individual sticks or spindles possess considerable lateral stiffness so that they are not easily damaged or broken when handled in raw condition.

Another object is to provide mechanical means whereby this specific form of macaroni can be manufactured uniformly, quickly and automatically.

Another object is to provide a perforated molding die of such peculiar construction that when macaroni dough is pressed through the same, it emerges from it in a finished form according to the principles set forth in the description of the invention.

Another object is to make the molding die of such simplified construction that it can be manufactured out of common round stock by simple machinery without the necessity of previously casting said members.

Other objects will become apparent from the description. The accompanying drawing, together with the following explanation will fully illustrate the principles of the invention:

In the drawing:—

Fig. 1 is a top view of a die plate, showing six circular perforations or recesses for the reception of the molding dies, five of the latter being shown in place;

Fig. 2 is a bottom view of the die plate showing the discharge ends of all six dies;

Fig. 3 is a fragmentary vertical cross-section along line 3—3 of Fig. 1 on an enlarged scale, the die being shown as an unbroken part in elevation;

Fig. 4 shows the die in side elevation, the view being taken as seen along the line 4—4 indicated on the top view shown in Fig. 7;

Fig. 5 is a vertical cross-section taken along the line 5—5 of Fig. 7;

Fig. 6 is another side elevation of the die taken at right angles to the one shown in Fig. 4, or from the right hand side of Fig. 7;

Fig. 7 is a top view and Fig. 8 a bottom view of the forming die;

Fig. 9 is a view in elevation of a broken off piece of the product, and

Fig. 10 is a diagrammatical representation illustrating the main principle of extrusion used in this invention.

It is to be understood that the number and the diameter of the die plates, the total number of inserted forming dies in each plate and the sizes of the individual dies will vary with the size and capacity of the machines employed and the size of the finished product, Fig. 9 illustrating only the typical form of the new species of macaroni.

The die-plate 10 is a disk or plate of any suitable form to fit into or upon a support provided for this purpose on the macaroni molding machine. It is in this illustration shown as a circular disk having an annular shoulder 11 and may for instance be supported on an annular inner bottom flange of a cylindrical vessel through which the dough is pressed by a piston, or a plurality of such die plates may be held supported by a number of recesses in the bottom plate of a large dough container and screwed to a false grilled bottom by means of tap screws, as the screw hole 12 indicates. These details, however, are unimportant and vary with the construction of machine employed. The invention is more specifically concerned with the construction of the forming or molding dies 14 which are supported by the sockets or recessed apertures 15 arranged concentrically in the die plate.

These dies, made of brass, aluminum or other suitable material, are of cylindrical shape, either straight or tapered very slightly and have a finished tight fit within their sockets. Advantageously they are also provided with an annular shoulder 16 supported by a corresponding ledge 16' in the socket 15. When the die is inserted its delivery end 14b is flush with the bottom side of the disk while its feed end may slightly protrude from the upper plate as shown in Fig. 3. This condition, however, may also be reversed and is a matter of convenience.

The die forms a hollow cylindrical vessel with a thickened bottom as Fig. 5 indicates. At the bottom of the cylindrical pit 17 the die wall is perforated by a round hole 18 and this aperture communicates with a spiral furrow 19 cut into the outer surface of the thickened bottom portion and running to within a short distance of the base as can best be seen in Figs. 6 and 3. The base or delivery end of the die is partly recessed or obliquely countersunk by a spiral sweep, as may best be seen by an inspection of Fig. 8. The area 20 is a flat portion of the base, at right angles to the axis of the die (see also Fig. 6). Starting from the edge 21 of the flattened area the material is cut away in a counter clockwise direction for about three-quarters of a turn by a helical cut which in itself is of concave shape. This leaves the outer edge 22 of the base sharp and projecting making a radially directed cross-section through the helical cut crescent-shape, as may be seen at 23, Fig. 5. The connection between the flat portion 20 and the end of the helical cutout is formed by an oblique straight surface 24. See Fig. 8 and Fig. 3. The purpose of this undercutting of the base is to provide the necessary clearance for an unrestricted formation of the issuing dough spiral. At right angles to the surface 24 a crescent-shaped aperture 25 is cut in the general direction of the above described spiral furrow 19 until it intersects with the latter and therefor forms the outlet of the furrow toward the delivery end of the die. See Fig. 3. It will be seen from this that the oblique surface 24 should be so arranged that it would cut the spiral furrow at right angles if the latter were continued to the end.

When the molding machine is in operation the dough is forced through the cylinder 17 into the aperture 18. As this aperture faces the inner wall of the socket 15 the dough then enters the spiral passageway 19, covered by the same wall of the socket. This passage, a V-shaped furrow, terminates into the crescent-shaped discharge opening 25, intersecting with it, and consequently the dough which is first formed into a short spiral ribbon with wedge-shaped cross-section, is flattened out into a channel-shaped ribbon. This ribbon, however, when leaving the molding die, does not protrude in a straight course but immediately curls upon itself in a closed conchoidal form as illustrated in Fig. 9.

The reason for this curling is somewhat complex as there are several reasons contributing to the same end. It may be pointed out of course that the dough particles do not all travel with the same speed as those nearest to the socket wall travel the fastest and consequently there is more material fed through at the summit of the crescent cut than at both ends which would account for the tendency to bend the course of the protruding dough. The dough particles travelling in the bottom of the furrow are furthermore slowed up when they encounter the tongue 25a (Figs. 3 and 8) encircled by the crescent, before they are spread out toward both sides. However, it is doubtful whether these causes would result in more than a loose spiral curling of the issuing dough, if there were not a more fundamental reason for the material to so behave.

It is a well-known fact in natural history that plastic or semi-plastic material when formed into a ribbon of crescent-like cross-section has a tendency to spontaneously assume a spiral or conchoidal form. The hair of a negro, for instance, has a crescent-shaped cross-section and is therefore curly, while the wavy hair of a Caucasian has an oval cross cut, and that of a Chinese is round.

In botany a similar phenomenon is often observed: tendrils and curly blades have a cross-section more or less like a crescent. Snails and conches, also the tooth of the narwhal and some ram's horns show the same cross-section. Fig. 10 illustrates this doctrine. It illustrates that even if the dough were extruded evenly through a straight channel of crescent cross-section, it would not proceed in a straight course but in a spiral manner; whether in a clockwise or counterclockwise direction being determined by the eventual existence of a deviation angle $d$ of the axis of the channel with the perpendicular and the circumstance whether in such case the crescent were on the left or the right side of the plane in which angle $d$ lies, looking toward the discharge opening. The angle of ascension of the helix depends besides the inclination angle of the discharge duct also upon the viscosity of the material; i. e. how far the cohesion of the plastic mass will yield to the directive force of gravity.

With a molding die formed as shown, i. e. with the ascension angle of the discharge helix about 60° with the vertical and the dough of the usual viscosity it has been found that the crescent strip of dough forms a completely closed conchoidal hollow form, as shown in Fig. 9. Although apparently the finished product is a hollow closed column with the material so arranged that its resistance in all directions is approximately the greatest possible, yet as the broken part of Fig. 9 shows, the single coils are not closed so tight that, when softened by hot water they do not open up somewhat to permit free access to the juice to all parts of the interior. In this respect they differ from all of the old forms of macaroni previously described. It is to be observed that when the dough leaves the crescent-shaped aperture 25 there are no guiding means provided for initiating the spiral descent of the dough, the helical spiral sweep starting from above the crescent opening and ending at the edge 21 merely providing the necessary clearance to permit the free passage of the product.

It is to be observed that many modifications of the described form of the article as well as the producing means are possible without deviating from the principles of the invention, and the scope of the invention therefore should not be judged too closely from the illustrations shown, but rather from the appended claims.

I claim:—

1. As an article of production a spiral macaroni of conchoidal form.

2. As an article of production a macaroni of crescent-shaped cross-section, wound spirally upon itself so as to form a closed conchoidal spindle.

3. As an article of production a macaroni shaped as a conchoidal spindle, hollow throughout with a spiral inner web running throughout its length.

4. As an article of production a macaroni shaped as a hollow conchoidal spindle, formed by a dough ribbon of crescent-like cross-section wound spirally around an axis in such manner that the generating crescent always faces the axis.

5. As an article of production a macaroni formed of a channel-shaped dough ribbon, spirally curled so as to form a conchoidal spindle.

6. In a molding machine adapted to mold plastic and semi-plastic material by extruding, a die adapted to shape said material into a conchoidal spindle, said die comprising a tube open at its feeding end and having a restricted crescent-shaped discharge orifice at its other end and a conduit interconnecting said open end and said crescent-shaped discharge orifice.

7. In a molding machine adapted to mold plastic and semi-plastic material by means of extrusion, a die adapted to shape said material into a hollow conchoidal spindle with a spiral inner web running throughout its length, said die comprising a tube open at its feeding end and having a restricted crescent-shaped discharge orifice at its other end and a conduit interconnecting said open end and said crescent-shaped discharge orifice.

8. In a molding machine adapted to mold plastic and semi-plastic material by extrusion, a die adapted to extrude a ribbon of said material of crescent-shaped cross-section so as to curl upon itself and form a closed conchoidal spindle, said die comprising a tube open at its feeding end and having a restricted crescent-shaped discharge orifice at its other end and a conduit interconnecting said open end and said crescent-shaped discharge orifice.

9. In a molding machine adapted for extrusion, a device for producing a spindle of plastic material of conchoidal form, said device comprising a die-plate with a socket and a hollow die supported in said socket, said die being provided with a hollow zone open toward the feeding side of said die-plate with a groove cut into the mantle of the die adjacent the discharge end, with a conduit adapted to form communication between the bottom of the hollow zone and the groove and with a crescent-shaped aperture cut into the discharge end of the die and communicating with the groove, all forming a continuous passageway through which the plastic material is extruded.

10. In a molding machine adapted for extrusion, a device for producing a spiral macaroni of conchoidal form, said device comprising a die-plate with a socket and a hollow die supported in said socket, said die being provided with a hollow zone open toward the feeding side of said die-plate with a groove cut into the mantle of the die adjacent the discharge end, with a conduit adapted to form communication between the bottom of the hollow zone and the groove and with a crescent-shaped aperture cut into the discharge end of the die and communicating with the groove, all forming a continuous passageway through which the plastic material is extruded.

11. In a machine adapted for extrusion of marconi, a device for extruding a spiral macaroni of conchoidal form, said device comprising a support adapted to hold a die in operative position, and a hollow die, said die being provided with a duct for the passage of dough from the hollow space of the die toward the discharge end, said duct terminating in a crescent-shaped discharge opening.

12. In a machine adapted for extrusion of macaroni, a device for extruding a spiral macaroni of conchoidal form, said device comprising a support provided with a socket and a die fittingly supported within the socket, said die being provided with a hollow space for receiving the macaroni dough, a wedge-shaped groove in the outer surface of the die communicating with the bottom of the hollow space and adapted to conduct the dough during the process of extrusion, and a crescent-shaped discharge opening located in the discharge end of said die and forming the terminal of the wedge-shaped groove.

13. In a machine adapted for extrusion of macaroni, a device for extruding a spiral macaroni of conchoidal form, said device comprising a support provided with a socket and a die fittingly supported within the socket, said die being provided with a hollow space for receiving the macaroni dough, a wedge-shaped groove cut spirally into the outer surface of the die communicating with the bottom of the hollow space and adapted to conduct the dough during the process of extrusion, and a crescent-shaped discharge opening located in the discharge end of said die, forming a continuation of the spirally cut groove, inclined at the same angle of ascension and communicating with it.

14. In a machine adapted for extrusion of plastic material, a die support and a die having a hollow zone, open at its feeding side, a crescent-shaped aperture at its discharge end and an open conduit, adapted to be covered by an adjacent portion of said die support, and leading from said hollow zone to the crescent-shaped aperture.

In testimony whereof, I affix my signature.

GUIDO TANZI.